United States Patent Office 3,430,522
Patented Mar. 4, 1969

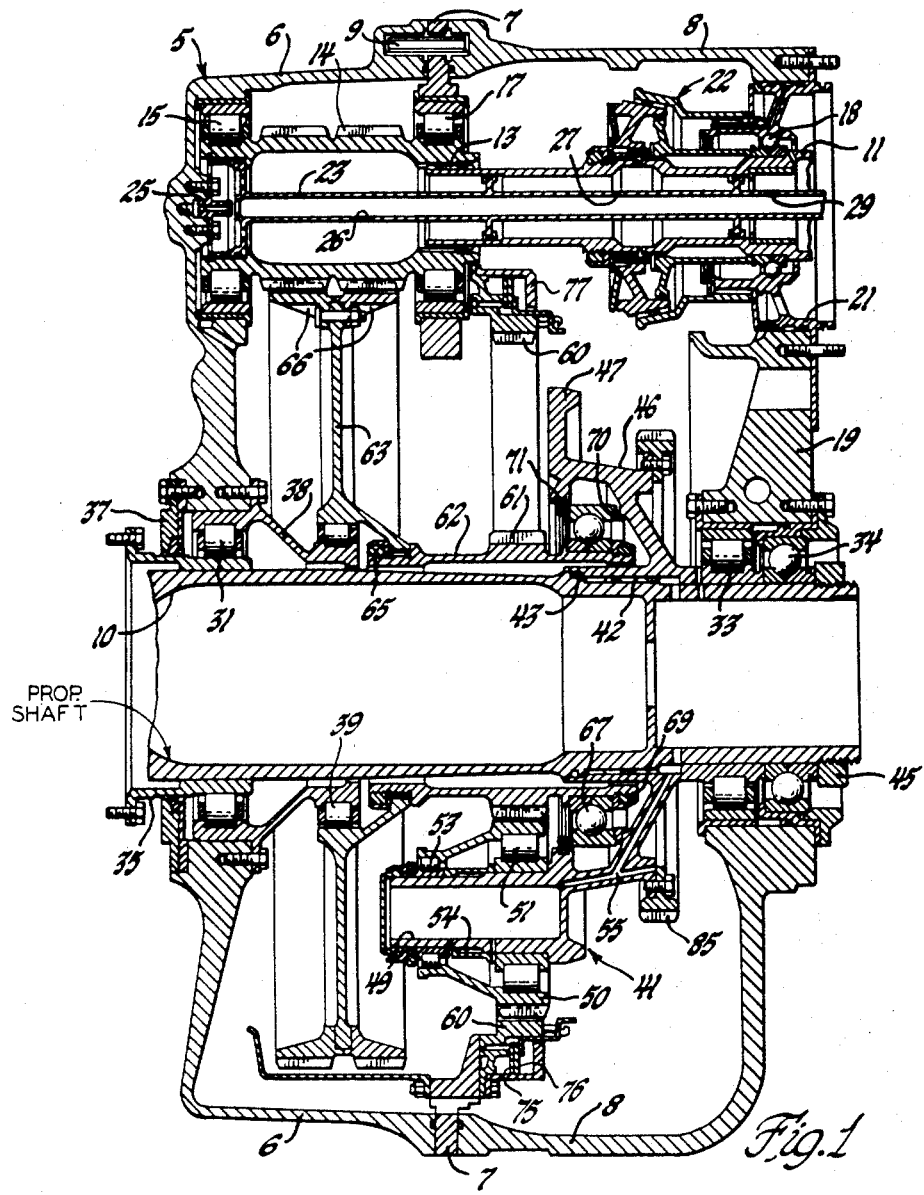

3,430,522
REDUCTION GEAR
Cyril M. Hawkins, Indianapolis, Ind., and Truman R. Richardson, Newton Solney, England, assignors to General Motors Corporation, Detroit, Mich., a corporation of Delaware
Filed Sept. 15, 1966, Ser. No. 579,608
U.S. Cl. 74—801           7 Claims
Int. Cl. F16h 1/28

ABSTRACT OF THE DISCLOSURE

A reduction gear for turboprop engines includes a first gear reduction between an input shaft and the sun gear of a planetary gear. The planet gear carrier is mounted on the propeller shaft, and a non-rotating ring gear mounted in the reduction gear case cooperates with the planet gears. The case is of a light alloy having a substantially different coefficient of thermal expansion from the shafting. The shafts are mounted in radial bearings at both ends of the case but in thrust bearings only at the rear end away from the propeller.

---

Our invention relates to reduction gears particularly suited to the requirements of gas turbine propeller aircraft propulsion power plants, commonly called turboprop engines. The problem of providing a suitable reduction gear for this sort of engine is a difficult one for many reasons. The importance of saving weight in aircraft is one. In view of the high speed of gas turbines and the low speed of propellers, a rather high reduction ratio is required, and the power transmitted may be 5000 horsepower. In addition to this, the propeller thrust which must be absorbed is quite substantial, something like 2½ pounds per horsepower. Another problem lies in the high inertia or flywheel effect of the propeller taken in connection with possible maneuvers or gust-induced changes of attitude of the aircraft. The resulting gyroscopic moments, when taken with the requirements for light weight, and the necessity for precision meshing of gears, leads to the result that an extremely rigid structure or else one which accommodates distortion without harmful disturbance of gear alignment is necessary. Another difficulty in the way of gear box designers for such installations is that the boxes must be as compact as possible to reduce the frontal area of the power plant.

One approach to the problems involved in such an installation is represented by United States Patent No. 2,936,655 of Peterson et al. in which the principal elements of the planetary reduction gearing are mounted more or less flexibly so that they can be self-aligning and thus accommodate themselves to distortions introduced by loads put on the reduction gear box. Our reduction gear box is similar to that of the Peterson et al. patent in that it embodies a first stage simple reduction gear followed by a planetary gearing for high overall speed reduction, but the arrangement is much different.

Also, provision of lightweight structures may require the use of material such as magnesium alloy for the reduction gear case. Since the shafts and gears must be made of high strength steels, additional problems are introduced by the difference in thermal expansion between the gearing and the case. One approach to the problems inherent in such differential expansion of the gearing and case is disclosed in the copending application of Lindgren et al. for Planetary Gearing, Ser. No. 507,849, filed Nov. 16, 1965 [Patent No. 3,352,178].

Our reduction gear, in its preferred embodiment, involves important differences in principle and in structural organization from the gear boxes referred to above. It embodies a structure in which the gearing is built around a propeller shaft which is integral with the propeller hub and in which the driving torque is transmitted to the rear end of the propeller shaft so as to minimize stresses at the forward end where gyroscopic moments are a maximum. It embodies a structure in which the shafts of the gear train are located axially by thrust bearings at one end of the case, the rear end in this installation, and are supported in axially-free radial bearings at the other end of the case. For greater compactness, the structure is arranged with the first reduction stage at the forward end of the case and the planetary second reduction stage behind the first reduction stage.

The principal objects of our invention are to provide a reduction gear better suited to aircraft requirements than those previously known, to provide a high power reduction gear of minimum weight and volume, to provide a simple reduction gear structure allowing for differential expansion between the gearing and the case, and to provide a reduction gear adapted to absorb the thrust and bending loads on a propeller shaft and to minimize the stresses in the propeller shaft. Other objects and advantages of our invention will be apparent from the succeeding detailed description of the preferred embodiment thereof.

Referring to the drawings, FIGURE 1 is a sectional view of a reduction gear with some parts broken away, the view being taken in section on a plane containing the axis of the propeller shaft.

FIGURE 2 is a partial view taken on a plane containing the axis of the propeller shaft illustrating a torque responsive mechanism.

Referring to FIGURE 1, the reduction gear comprises a roughly cylindrical case 5 comprising a front housing 6, a center plate 7, and a rear housing 8. These parts of the case are cast from a high strength magnesium alloy such as AMS–4418. They are fixed together by bolts (not illustrated) and aligning dowels 9. A hollow propeller shaft 10, which is preferably integral with the hub of the propeller (not shown) extends through the case from front to rear approximately centrally of the case. The propeller is disposed forwardly of the reduction gear (to the left as illustrated). The gas turbine (not shown) drives the rear end of a first or power input shaft 11 through any suitable coupling (not illustrated). The input shaft is splined at 13 to a herringbone pinion 14 mounted at the forward end of the case. This pinion is supported by axially-free roller bearings 15 and 17 in the front wall and center plate, respectively. The rear end of shaft 11 is supported in a ball thrust bearing 18 which locates the shaft axially in the rear wall 19 of the rear housing. Bearing 18 is mounted in the rear wall within a support 21 which also mounts a propeller brake 22. The propeller brake may be similar in principle to those described in United States Patent No. 2,936,655, and the details are immaterial to the present invention. The purpose of the propeller brake is to hold the propeller shaft against rotation when the brake is engaged, but the principles of our invention would not be affected if the brake were removed. An oil tube 23 supported in the front hub of pinion 14 and in shaft 11 receives oil through its open front end from oil jet 25 and discharges it through lateral openings such as 26, 27, and 29 to lubricate the splines, propeller brake, and bearing 18. Details of lubrication are not important to our invention.

The propeller shaft 10 is mounted in axially-free radial bearings 31 in the forward wall of the case and 33 in the rear wall 19. It is also located axially by a ball thrust bearing 34 fixed in the rear wall. The inner race of bearing 31 is provided by a ring 35 forming part of the propeller. A ring 37 retains a seal at the forward side of bearing 31. The outer race of bearing 31 is defined by a more or less conical ring 38 bolted to the forward wall which also defines the inner race of a roller bearing 39. A planet carrier 41 is piloted on the rear end of the propeller shaft, splined to it at 42, and bearing against a shoulder 43. The inner race of bearing 33 abuts the hub of the planet carrier and the inner race of thrust bearing 34 abuts that of bearing 33. When the propeller shaft is installed, the nut 45 retains these parts assembled on the propeller shaft and transmits the normal forward thrust of the propeller to the thrust bearing. Rearward thrust of the propeller, which may occur, will be transmitted from shoulder 43 to the thrust bearing.

The planet carrier 41 comprises a more or less conical disk 46 and a radial flange 47 from which extend seven trunnions 49, each mounting a planet gear 50. These planet gears have conical hubs or shafts which define the outer races of a main roller bearing 51 and a lesser roller bearing 53 which support the planet gear rotatably on the trunnion. The trunnion and a spacer 54 between the bearing inner races have passages for oil to flow to these bearings, this oil being supplied from within the propeller shaft through passages 55 in the planet carrier.

The planet gears 50 mesh with a non-rotating ring gear 60 and with a sun gear 61 which is integral with a shaft 62. The forward end of shaft 62 is splined to the hub of a bull gear assembly 63 which is retained by a nut 65. The bull gear comprises a disk and two gear rings 66 bolted to the rim of the disk. The hub of the bull gear rolls on axially-free bearing 39, thus providing a support for the forward end of shaft 62. The rear end of shaft 62 is mounted in a ball thrust bearing 67 which is retained on the shaft by a nut 69. The outer race of bearing 67 abuts a conical thrust washer 70 which in turn is seated on a ridge on the forward face of the planet carrier. The normal thrust of the sun gear, resulting from the pitch of the helical teeth, is rearward, opposing the propeller thrust. Rings 71 mounted in an annular recess in the planet carrier may serve as vibration dampers or as a forward abutment for the outer race of bearing 67 in the event of reversal of torque and, therefore, gear thrust.

The ring gear 60 is mounted on the center plate 7 with freedom for limited axial movement by structure shown most clearly in FIGURE 2. Helical splines 72 on a flange 73 of the ring gear engage helical splines on the interior of a mounting ring 74 fixed to the center plate 7. A pair of oppositely inclined Belleville springs 75 and 76 are mounted within an annular retainer 77 so that the inner margin of spring 75 is adapted to bear against the splined mounting ring 74 or the flange 73. The outer margins of the two springs bear against each other, and the inner margin of spring 76 bears against flange 78 of an actuating ring 79 which has a second flange 80. Fingers 81 extend from the ring gear 60 through slots 82 in the actuating ring. A split ring 83 mounted in an internal circumferential groove in the fingers 81 may bear against the radial face 80 of ring 79. Under no torque conditions, springs 75 and 76 deflect apart at their inner margins, pushing actuating ring 79 to the right, as shown in the drawings, until its flange 78 bears against the ring 77. The actuating ring 79 thus biases the ring gear to the right or rearwardly from the position shown until the flange 73 of the ring gear abuts the inner margin of spring 75. This may be considered the neutral or low-torque position of the ring gear. However, the pitch of the planetary gears and of splines 72 are such that the normal driving torque biases the ring gear forwardly and is sufficient to collapse the Belleville springs 75 and 76 so that the normal operating position of the ring gear is as shown.

The axial movement of the ring gear does not affect the transmission of power or the operation of the reduction gear described above. It is employed as part of means for sensing and signaling under-torque or reverse torque conditions of the engine which are the subject matter of our copending application for Torque-Responsive Device, Ser. No. 579,598, filed herewith.

The operation of the gearing should be clear but may be considered briefly. The engine driven input shaft 11 is located by ball bearing 18 in the rear wall 19 and is splined to herringbone pinion 14. This pinion drives bull gear 63 and thus sun gear 61, these being located axially by ball bearing 67 located by the planet carrier 41 which in turn is fixed to the propeller shaft 10. The propeller shaft is located axially by bearing 34 in the rear wall and is driven by the action of planet gears 50 rolling on the nonrotatably mounted ring gear 60. The pinion 14 may slip slightly on splines 13 for alignment with the bull gear 63. All of the gears are aligned and the shaft thrusts are taken by the rear wall 19 except that the ring gear is mounted on the center plate 7. Expansion of the magnesium case relative to the steel shafts is accommodated by movement of roller bearings 15, 17, 31, and 39, which are axially free. The propeller shaft is smooth and has no splines, lubricant holes, or other interruptions of its smooth contour at the forward end of the box where the bending moments due to propeller gyrostatic action are greatest. The torque is transmitted to the shaft at the rear end, where stresses and deflection of the shaft are a minimum, by the planet carrier 41. As will be apparent, the location of the gears is such as to provide a very compact box which in turn tends to reduce weight and increase the strength and rigidity of the case. The thrust of the helical planet gears unloads thrust bearing 34 to some extent.

The gear 85 bolted to the pinion carrier provides for drives to engine or aircraft accessory devices through gearing which is not shown. These accessories may be bolted to the rear wall 19 of the case.

Considering now the operation of the torque responsive mechanism, this performs the same function as the torque responsive propeller control of United States Patent No. 2,959,228. The reason for providing such controls is explained fully in the patent, but may be reviewed briefly. It is desired to have means (1) to indicate failure of the engine to deliver substantial power when full power is called for and (2) to signal negative torque; that is, torque in which the propeller supplies power to the engine when this increases above a certain value. Thus, the torque responsive mechanism illustrated in FIGURE 2 has three positions, one representing the normal condition of engine operation condition above a predetermined power output, an intermediate or neutral position representing a lower power output, and a third position representing power input to the engine above a certain level.

As previously described, the action of springs 75 and 76 on the torque responsive mechanism results in shifting of the ring gear 60 under changing conditions of torque which creates a thrust on the ring gear because of the helical gearing and splines. This is sensed by a plunger assembly 88 slidably mounted in a support 89 bolted to the case and in a bushing 90 fixed to the rear wall 19 of the case. The plunger 88 includes a flange 91 which slides within the bushing 90 and bears a peripheral seal. A flange 92 at the outer end of the plunger 88 may be connected to a suitable actuated device and corresponds in function to the push rod 64 of United States Patent No. 2,959,228. Plunger assembly 88 comprises an outer member 93, an intermediate member 94, and a follower 95. The follower 95 bears against the portion 81 of the ring gear. It is slidably connected to the intermediate member 94 by means of a bolt 97 and an overtravel spring 98. The relation of parts 94 and 95 is normally constant, but the follower 95 can move rearwardly in the case of overtravel of the ring gear with respect to the actuated control. The intermediate member 94 is connected to the outer member 93 by threads to to provide a position adjustment, and is locked by jam nut 99. A spring 100 bearing against a flange of bushing 90 maintains the plunger assembly 88 in contact with the ring gear.

Reviewing the operation of this device, bear in mind that as shown in FIGURE 2 it is in the position representing normal engine output. If the torque decreases sufficiently, the Belleville springs will expand and push actuating ring 79 and ring gear 60 rearwardly until flange 78 of the actuating ring engages the retainer 77. This, of course, extends plunger 92 a perceptible distance to the rear. The parts remain in this position under lower torque conditions but, upon the occurrence of a predetermined reverse torque, the reverse torque biasing the ring gear rearwardly will act against the inner margin of spring 75 and again collapse the Belleville springs. In this action, the ring gear moves further rearwardly, sliding on the mounting splines and on the interior of actuating ring 79. This displaces the plunger 88 to the third position indicating a predetermined reverse torque.

As will be seen, the reduction gear of our invention facilitates the installation of a simple and satisfactory torque-responsive mechanism.

The other advantages of our reduction gear will be apparent from the foregoing discussion.

The description of the preferred embodiment of the invention for the purpose of explaining the principles thereof is not to be considered as limiting or restricting the invention, since many modifications may be made by the exercise of skill in the art.

We claim:
1. A reduction gear comprising, in combination,
   a case made of a material having a certain coefficient of thermal expansion,
   first and second shaft means disposed substantially parallel in said case made of materials having coefficients of thermal expansion significantly different from that of the case,
   the first shaft means being a power input means,
   the second shaft means including a power output shaft adapted to drive a load disposed ahead of the case,
   each of the first and second shaft means being mounted in a thrust bearing at the rear end of the case and in an axially-free radial bearing at the front end of the case,
   the first shaft means including a pinion at the front end of the case,
   third shaft means coaxial with the second shaft means including
   a bull gear meshing with the pinion to provide a first stage gear reduction and
   a sun gear fixed to the bull gear,
   the third shaft means being mounted on the second shaft means by a thrust bearing and on the front end of the case by an axially-free radial bearing,
   the second shaft means including a planet carrier,
   the gear including planet gears on the carrier meshing with the sun gear and
   a ring gear non-rotatably mounted on the case intermediate the ends thereof meshing with the planet gears.

2. A reduction gear as defined in claim 1 wherein the power output shaft is the shaft of an aircraft propeller.

3. A reduction gear as defined in claim 2 in which the power output shaft has a smooth configuration near the front end of the case, thereby avoiding stress risers near the front end,
   and the planet carrier is fixed to the power output shaft adjacent the rear end of the case.

4. A reduction gear as defined in claim 1 in which the planet carrier is splined to the power output shaft adjacent the rear end of the case.

5. A reduction gear as defined in claim 1 in which the pinion and bull gear are of the herringbone type.

6. A reduction gear as defined in claim 1 in which the load imposes a thrust on the second shaft means
   and the sun gear, planet gears, and ring gear are of helical configuration pitched so as to oppose the said thrust in response to driving torque.

7. A reduction gear as defined in claim 1 in which the case is made of magnesium alloy.

References Cited

UNITED STATES PATENTS

| | | | |
|---|---|---|---|
| 2,520,887 | 8/1950 | Miller | 170—135.75 XR |
| 2,715,834 | 8/1955 | Chamberlin | 74—801 XR |
| 2,825,247 | 3/1958 | Haworth et al. | 74—801 |
| 3,309,936 | 3/1967 | Gaubis | 74—410 |
| 3,352,178 | 11/1967 | Lindgren et al. | 74—801 |

OTHER REFERENCES

Mark's Mechanical Engineers Handbook, sixth ed., October 1958, McGraw-Hill Co., Inc., pp. 6–89.

DONLEY J. STOCKING, *Primary Examiner.*

LEONARD H. GERIN, *Assistant Examiner.*

U.S. Cl. X.R.

74—410